United States Patent [19]

Klausner et al.

[11] Patent Number: 4,925,698

[45] Date of Patent: May 15, 1990

[54] SURFACE MODIFICATION OF POLYMERIC MATERIALS

[75] Inventors: Mitchell Klausner, Sharon; Michael P. Manning, Nahant; Raymond F. Baddour, Belmont, all of Mass.

[73] Assignees: Tekmat Corporation, Ashland, Mass.; Revlon, Inc., New York, N.Y.

[21] Appl. No.: 320,810

[22] Filed: Mar. 8, 1989

Related U.S. Application Data

[63] Continuation of Ser. No. 159,344, Feb. 23, 1988, abandoned.

[51] Int. Cl.$^5$ ............................. G02C 7/04; B05D 5/06
[52] U.S. Cl. .................................... 427/2; 427/164; 427/255.4; 427/400
[58] Field of Search ............... 427/164, 400, 255.4, 427/2; 350/160 H; 428/409

[56] References Cited

U.S. PATENT DOCUMENTS

| | | | |
|---|---|---|---|
| 2,976,576 | 3/1961 | Wichterle et al. | 18/58 |
| 3,108,902 | 10/1963 | Galli et al. | 427/400 |
| 3,220,960 | 11/1965 | Wichterle et al. | 260/2.5 |
| 3,503,393 | 3/1970 | Manley | 128/145.6 |
| 3,560,424 | 5/1971 | Glaser | 260/29.6 |
| 3,657,003 | 4/1972 | Kenney | 427/302 |
| 3,963,662 | 7/1975 | Fujiwara et al. | 260/29.6 WB |
| 4,131,696 | 12/1978 | Covington | 427/164 |
| 4,168,112 | 6/1979 | Ellis et al. | 427/164 |
| 4,338,419 | 7/1982 | Korb et al. | 525/350 |
| 4,388,345 | 6/1983 | Kishida et al. | 427/164 |
| 4,409,285 | 10/1983 | Swerdlow | 427/164 |
| 4,544,572 | 10/1985 | Sandvig | 427/44 |
| 4,569,858 | 2/1986 | Lim et al. | 427/164 |

OTHER PUBLICATIONS

*Textbook of Organic Chemistry*, Ferguson, Van Nostrand, Princeton, N.J., 1958, p. 229.

*Primary Examiner*—Janyce Bell
*Attorney, Agent, or Firm*—Fish & Richardson

[57] ABSTRACT

A method of increasing the adsorption resistance of a polymer having surface carboxyl or hydroxyl groups by directly contacting the surface of the polymer with an acylating agent under conditions sufficient to chemically react the carboxyl or hydroxyl groups with the acylating agent.

17 Claims, 20 Drawing Sheets

SURFACE MODIFICATION OF POLYMERIC MATERIALS

This is a continuation of application Ser. No. 159,344 filed Feb. 23, 1988, now abandoned.

BACKGROUND OF THE INVENTION

This invention relates to chemically modifying the surfaces of polymeric materials.

A number of polymers useful in the biomedical field, e.g., for storing, dispensing, handling, or transferring materials such as drugs, proteins, biological macromolecules, and vaccines contain hydroxyl or carboxyl groups (or both) either as end groups or side groups along the polymer chain. Examples of polymers (including elastomers, rubbers, or plastics) having hydroxyl or carboxyl side groups include poly(hydroxyethyl methacrylate) and polyvinyl alcohols. Polymers having hydroxyl or carboxyl end groups include polyesters, polycarbonates, polylactones, polyurethanes, polyacetals, polyethers, silicones, and polyamides (e.g., nylons). In addition, polymers crosslinked using crosslinking agents such as diols and dihydroxy phenols will contain terminal hydroxyl groups.

One problem associated with these polymers is the deposition of materials such as proteins, biological macromolecules, drugs, or vaccines on the surface of the polymer due to hydrogen bonding between the deposited material and surface hydroxyl or carboxyl groups. Such deposition limits the usefulness of these polymers because the adsorbed materials are often very costly. Lim et al., U.S. Pat. No. 4,569,858 describes improving the soil resistance, e.g., to proteins, of a contact lens made from a hydrophilic polymer having surface hydroxyl and carboxyl groups by either treating the lens directly with reagents such as diazoalkanes, dimethylformamide dialkyl acetals, and the reaction product of alkylenediisocyanate and polyethylene glycol monomethyl ether, or by pretreating the lens with a strong base followed by treatment with a relatively high molecular weight acylating agent (e.g., neodecanoyl chloride or pivaloyl chloride).

SUMMARY OF THE INVENTION

In general, the invention features a method of increasing the adsorption resistance of a polymer having surface carboxyl or hydroxyl groups that includes directly contacting the surface of the polymer with an acylating agent under conditions sufficient to chemically react the carboxyl or hydroxyl groups with the acylating agent. By "acylating agent" it is meant an acyl group-containing reagent that is capable of reacting with the carboxyl or hydroxyl groups to form an ester (in the case of hydroxyl groups) or an acid anhydride (in the case of carboxyl groups).

In preferred embodiments, the acylating agent is an acid halide (e.g., chloride, bromide, iodide, or fluoride) preferably having between 1 and 4 carbon atoms, inclusive, e.g., acryloyl chloride or acetyl chloride; an acid anhydride preferably having between one and ten carbon atoms, inclusive, e.g., acetic anhydride; or an amide preferably having between one and ten carbon atoms, inclusive, e.g., acetamide. The acylating agent is preferably used in the vapor phase. The protein uptake of the treated polymer preferably is less than 25 $\mu g/cm^2$ (more preferably less than 10 $\mu g/cm^2$).

Examples of preferred polymers include polymers having hydroxyl or carboxyl side groups, e.g., poly(hydroxyesters) and polyvinyl alcohols; and polymers having hydroxyl or carboxyl end groups, e.g. polyesters, polycarbonates, polylactones, polyurethanes, polyacetals, polyethers, polyamides, and silicone rubbers. Also preferred are crosslinked polymers in which the crosslinking agent contains unreacted hydroxyl or carboxyl groups.

The invention enables the preparation of polymeric materials having improved adsorption resistance using simple, relatively low molecular weight acylating agents. Pretreatment with strong bases is not necessary. Furthermore, by utilizing the acylating agent in the gas phase, the need for organic solvents that can swell, dissolve, or degrade the polymer is eliminated. Reaction times and temperatures are also reduced.

Other features and advantages of the invention will be apparent from the following description of the preferred embodiments thereof, and from the claims.

DESCRIPTION OF THE PREFERRED EMBODIMENTS

We now describe preferred embodiments of the invention.

A polymer, as described above, is treated to improve its adsorption resistance, e.g., to proteins, by exposing the polymer to acylating agent vapor for up to about 256 hours or less at temperatures between room temperature and about 100° C. During exposure, the acylating agent chemically reacts with hydroxyl and/or carboxyl groups on the polymer surface to create a surface which will bind proteins to a much lesser degree. Surprisingly, the surface can be formed without pretreating the polymer with strong base or using high molecular weight acylating agents having long hydrocarbon portions.

Preferred acylating agents are acid chlorides having between 1 and 4 carbon atoms, inclusive, e.g., acetyl chloride

and acryloyl chloride

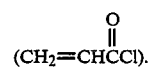

When reacted with a surface hydroxyl group, an ester is formed according to the following reaction sequence:

R=CH$_3$, CH$_2$=CH

When reacted with a surface carboxyl group, an anhydride is formed according to the following reaction sequence:

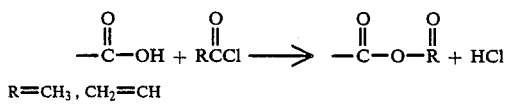

R=CH$_3$, CH$_2$=CH

Other suitable acylating agents include other acid halides (e.g., bromides, iodides, or fluorides), acid anhydrides (e.g., acetic anhydride), and amides (e.g, acetamide). These reagents react with surface hydroxyl and carboxyl groups according to reaction sequences similar to those described above for acid chlorides.

Once the reaction is complete, the polymer is removed. The adsorption resistance of the polymer, as measured by the amount of protein adsorbed on the polymer surface following immersion in a lysozyme solution for 24 hours, is less than 25 $\mu g/cm^2$, preferably less than 10 $\mu g/cm^2$.

This method can also be used to treat hydrophilic contact lenses, as described in Klausner et al., U.S.S.N. 323,097, entitled "Method of Increasing the Soil Resistance of Hydrophilic Contact Lenses," filed the same day and assigned to the same assignees as the present application, hereby incorporated by reference.

EXAMPLE

Three dry discs of poly(hydroxyethyl methacrylate) were placed in an acryloyl chloride vapor-containing chamber for one hour at room temperature. The treated discs were then removed and placed in a lysozyme solution for 24 hours to measure protein uptake. Three untreated discs were also placed in the solution as a control. After one day, the discs were removed and the protein adsorbed on the surfaces measured spectrophotometrically. The results are shown in Table 1.

TABLE 1

| Sample | Protein Uptake ($\mu g/cm^2$) | Sample | Protein Uptake ($\mu g/cm^2$) |
| --- | --- | --- | --- |
| Untreated disc #1 | 508 | Treated disc #1 | 5 |
| Untreated disc #2 | 521 | Treated disc #2 | 8 |
| Untreated disc #3 | 505 | Treated disc #3 | 8 |

Other embodiments are within the following claims.

For example, the polymer could be treated with a solution of the acylating agent prepared by dissolving the agent in an aprotic solvent that does not react with the agent or swell, dissolve, or degrade the polymer.

We claim:

1. A method of increasing the adsorption resistance of a polymer having surface carboxyl or hydroxyl groups comprising directly contacting the surface of said polymer with an acylating agent in the vapor phase under conditions sufficient to chemically react said carboxyl or said hydroxyl groups with said acylating agent without pretreating said surface with base.

2. The method of claim 1 wherein said acylating agent comprises an acid halide.

3. The method of claim 2 wherein said acid halide has between 1 and 4 carbon atoms, inclusive.

4. The method of claim 2 wherein said acid halide is acryloyl chloride.

5. The method of claim 2 wherein said acid halide is acetyl chloride.

6. The method of claim 1 wherein said acylating agent comprises an acid anhydride.

7. The method of claim 1 wherein said acylating agent comprises an amide.

8. The method of claim 1 wherein said carboxyl or hydroxyl groups are present as side groups in said polymer.

9. The method of claim 1 wherein said carboxyl or hydroxyl groups are present as end groups in said polymer.

10. The method of claim 1 wherein said polymer is crosslinked and said carboxyl or hydroxyl groups are from the reagent used to crosslink said polymer.

11. A method of increasing the soil resistance of a hydrophilic contact lens having surface carboxyl or hydroxyl groups comprising directly contacting the surface of said lens with an acylating agent in the vapor phase under conditions sufficient to chemically react said carboxyl or said hydroxyl groups with said acylating agent without pretreating said surface with base.

12. The method of claim 11 wherein said acylating agent comprises an acid halide.

13. The method of claim 12 wherein said acid halide has between 1 and 4 carbon atoms, inclusive.

14. The method of claim 12 wherein said acid halide is acryloyl chloride.

15. The method of claim 12 wherein said acid halide is acetyl chloride.

16. The method of claim 11 wherein said acylating agent comprising an acid anhydride.

17. The method of claim 11 wherein said acylating agent comprises an amide.

* * * * *